(12) United States Patent
Zhuang

(10) Patent No.: US 10,858,172 B2
(45) Date of Patent: Dec. 8, 2020

(54) AIRTIGHT THERMAL INSULATION PACKAGE

(71) Applicant: Qiujing Zhuang, Fujian (CN)

(72) Inventor: Qiujing Zhuang, Fujian (CN)

(73) Assignee: Huian Huicheng Handbag Co., Ltd., Quanzhou (CN)

( * ) Notice: Subject to any disclaimer, the term of this patent is extended or adjusted under 35 U.S.C. 154(b) by 70 days.

(21) Appl. No.: 16/228,591

(22) Filed: Dec. 20, 2018

(65) Prior Publication Data

US 2020/0002078 A1    Jan. 2, 2020

(30) Foreign Application Priority Data

Jun. 28, 2018   (CN) .................... 2018 2 1013277 U

(51) Int. Cl.
| | |
|---|---|
| *B65D 25/02* | (2006.01) |
| *B65D 81/38* | (2006.01) |
| *A47J 41/00* | (2006.01) |
| *B65D 43/16* | (2006.01) |
| *B65D 53/02* | (2006.01) |
| *B65D 25/28* | (2006.01) |

(52) U.S. Cl.
CPC ...... *B65D 81/3834* (2013.01); *A47J 41/0072* (2013.01); *B65D 25/02* (2013.01); *B65D 25/2838* (2013.01); *B65D 43/16* (2013.01); *B65D 53/02* (2013.01)

(58) Field of Classification Search
CPC ............ B65D 21/0233; B65D 81/3834; B65D 53/02; B65D 43/16; B65D 25/02; A45C 11/20; A45C 13/008

USPC ............... 220/378, 23.89, 23.87, 23.86
See application file for complete search history.

(56) References Cited

U.S. PATENT DOCUMENTS

| | | | | |
|---|---|---|---|---|
| 1,015,455 | A * | 1/1912 | Neesham | B65D 21/086 220/8 |
| 2,212,804 | A * | 8/1940 | Wynings | B65D 51/14 215/200 |
| 2,910,209 | A * | 10/1959 | Nelson | A61G 17/02 220/378 |
| 3,334,774 | A * | 8/1967 | Poltorak | F16J 15/106 220/378 |
| 2012/0080432 | A1* | 4/2012 | Bensman | B25H 3/023 220/324 |

* cited by examiner

*Primary Examiner* — Stephen J Castellano

(57) ABSTRACT

The invention discloses an airtight thermal insulation package with physical sucker structure at the convex edge of the opening thereof, comprising a package body and a side flip cover connected with it; the body upper adopts convex-edge structure, the body and cover comprise thermal insulation inner and connecting outer layers; the structure upper has sucker rubber ribbon connected with cover; the body has a placing tray guided by the guide block; between the block and tray is an elastic piece providing stretching force for block; the connecting end of body and cover is a snap groove, the cover has a snap block fitting the groove; the outer side of body and cover is a connecting piece for closing them; the tray upper has a concave groove, hinged with two handles. It has following advantages: good sealing, long service life, no food sprinkling, and good thermal insulation effect.

8 Claims, 6 Drawing Sheets

AIRTIGHT THERMAL INSULATION PACKAGE

BACKGROUND OF THE INVENTION

1. Field of the Invention

The invention relates to the technical field of package, and in particular, to an airtight thermal insulation package with physical sucker structure at the convex edge of the opening thereof.

2. Description of the Related Art

The package that can be used for outdoor picnics or daily life, and for holding various foods and maintaining the temperature and freshness thereof, belongs to one kind of outdoor packages. Thermal insulation packages generally adopt skill screen and colorful patterns. Nonwoven thermal insulation packages may adopt coating film or thermal transfer and offset printing. Thermal insulation packages made of Oxford fabric or polyester generally adopt thermal transfer.

For the prior airtight thermal insulation packages, the package cover is designed to be bulged inward to cover the package periphery; the sealing effect of the package opening of the product is bad, and the zipper is easily wetted by water during the usage, thereby reducing the service life of the sealing zipper.

Therefore, how to design an airtight thermal insulation package with physical sucker structure at the convex edge of the opening thereof is a problem to be solved at present.

SUMMARY OF THE INVENTION

With respect to the shortcomings above in the prior art, the invention provides an airtight thermal insulation package with physical sucker structure at the convex edge of the opening thereof, which is compact in structure, convenient to use, convenient for placing and removing food, and the food is not easy to be sprinkled.

To achieve the above objective, the invention adopts the following technical solution:

An airtight thermal insulation package with physical sucker structure at the convex edge of the opening thereof, comprising a package body and a side flip cover connected with the package body, wherein the periphery of the upper end of the package body is a convex-edge structure, and the package body and the side flip cover both comprise a thermal insulation inner layer and a connecting outer layer; the upper end of the convex-edge structure is provided with a sucker rubber ribbon enabling an adsorption connection with the side flip cover; the middle portion of the opposite surface of the thermal insulation inner layer is provided with a guide groove; the inside of the package body is provided with a placing tray for lifting up and down along the guide groove, and the placing tray is provided with a guide block mating with the guide groove; between the guide block and the placing tray is provided with an elastic piece providing a stretching force for the guide block; the connecting end of the package body and the side flip cover is provided with an snap groove, and the side flip cover is provided with a snap block enabling a snap-fit with the snap groove; the outer side of the connecting end of the package body and the side flip cover is provided with a connecting piece for closing the package body and the side flip cover; the upper end of the placing tray is provided with a concave groove, and two handles are symmetrically hinged in the concave groove.

Further, the outer surface of the connecting outer layer is provided with a hand strap.

Further, the sucker rubber ribbon comprises a concave arc edge and a bonding plate disposed at the lower end of the concave arc edge; a concave groove for pressing and deforming the sucker rubber ribbon is formed between the concave arc edge and the bonding plate; one side of the concave arc edge is provided with a pull tab for opening and closing the side flip cover.

Further, the thermal insulation inner layer and the connecting outer layer are both made of aluminum film composite TPU material.

Further, the upper end of the side of the placing tray is provided with a notch for toggling the handle.

Further, the connecting piece is a waterproof zipper or a bonding tape.

Further, the thermal insulation lining is filled between the thermal insulation inner layer and the connecting outer layer.

Further, the upper and lower ends of the guide block are both arcuate in shape.

The advantageous effects of the invention are:

The airtight thermal insulation package with physical sucker structure at the convex edge of the opening thereof improves the shortcomings of original products that the sealing effect is bad and the service life of the device is short. Through the effect of the convex edge and the sucker rubber ribbon provided in the package opening, the liquid or gas inside and outside can be more effectively prevented from entering and exiting, thereby the sealing and thermal insulation effects are better achieved and the user experience is further improved. The sealing zipper of the product adopts the waterproof sealing zipper or the bonding tape, which has excellent waterproof performance and corrosion resistance, and can effectively prevent water vapor corrosion and greatly improve the service life of the product. The placing tray is provided with two handles, which can improve the stability when carrying the placing tray and the food is not easy to be sprinkled. The handle can be placed in the concave groove without affecting the placement of the placing tray in the upper layer, and the placing tray is guided through the guide groove, which further improves the stability of the placing tray. The guide groove is disposed at the middle portion of the end surface without affecting the arrangement of the sucker rubber ribbon; the guide block can be elastically stretched, and the upper and lower ends thereof are arcuate, which is convenient for pushing and taking out.

PREFERRED EMBODIMENTS OF THE INVENTION

Figure 1:
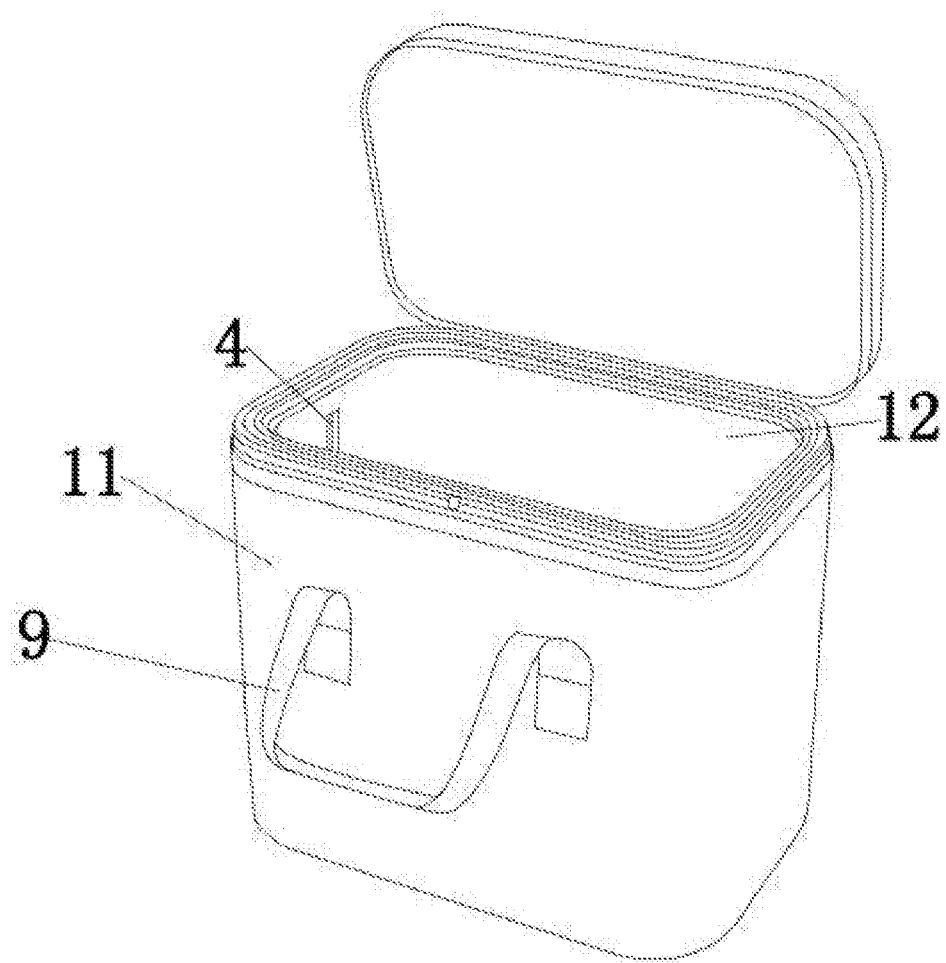
FIG. 1 is a schematic view illustrating the stereoscopic structure of the invention when the package cover is open.

The specific embodiments of the invention will be further described hereinafter with reference to the accompanying drawings, wherein the same components are indicated by the same reference numerals. It should be noted that the words "front", "back", "left", "right", "upper" and "lower" used in the following description refer to the directions in the drawings, and the words "inner" and "outer" refer to the directions toward or away from the geometric center of a particular component, respectively.

In order to make the content of the invention easier to be understood clearly, the technical solutions in the embodiments of the invention will be clearly and completely described hereinafter with reference to the accompanying drawings.

Figure 2:
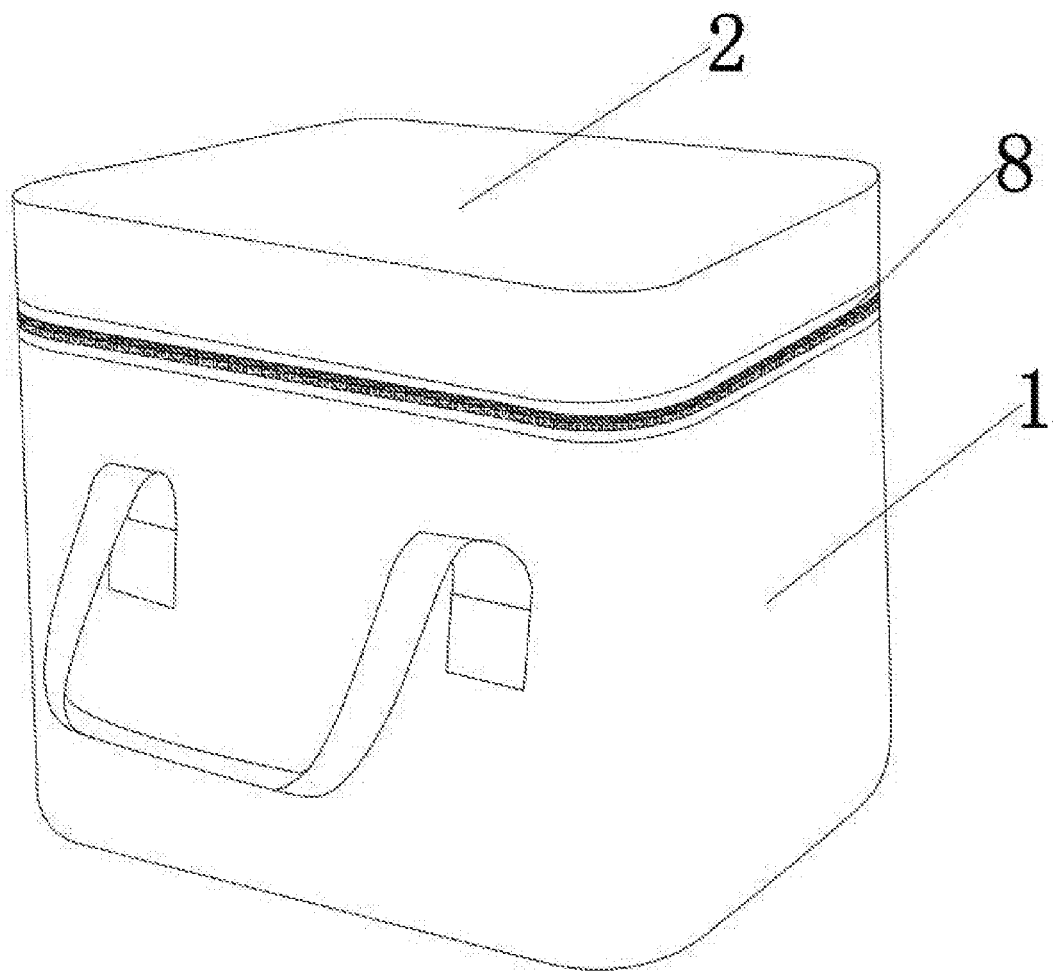
FIG. 2 is a schematic view illustrating the stereoscopic structure of the invention when the package cover is closed.
Figure 3:
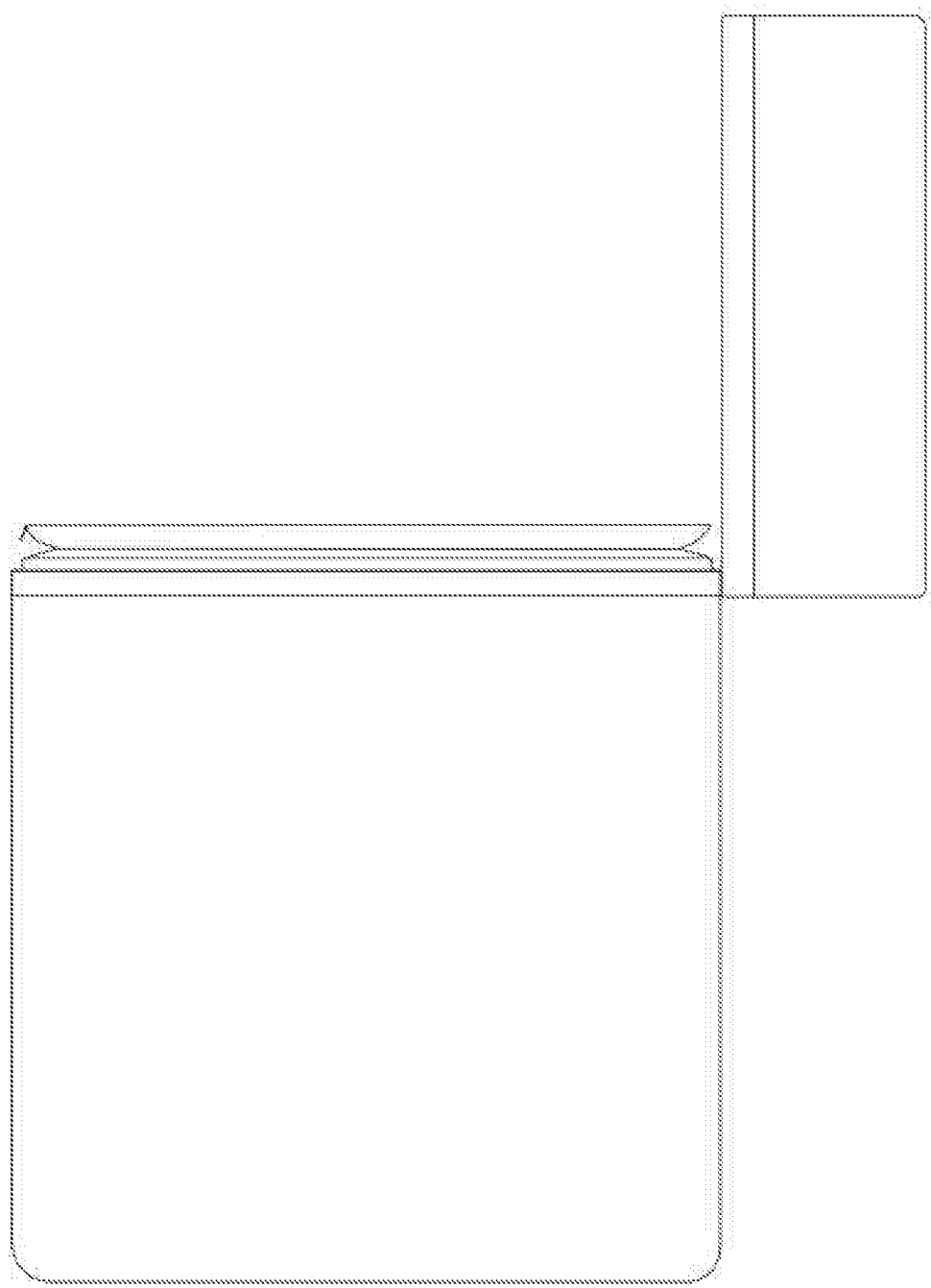
FIG. 3 is a schematic view illustrating the side of the invention.
Figure 4:
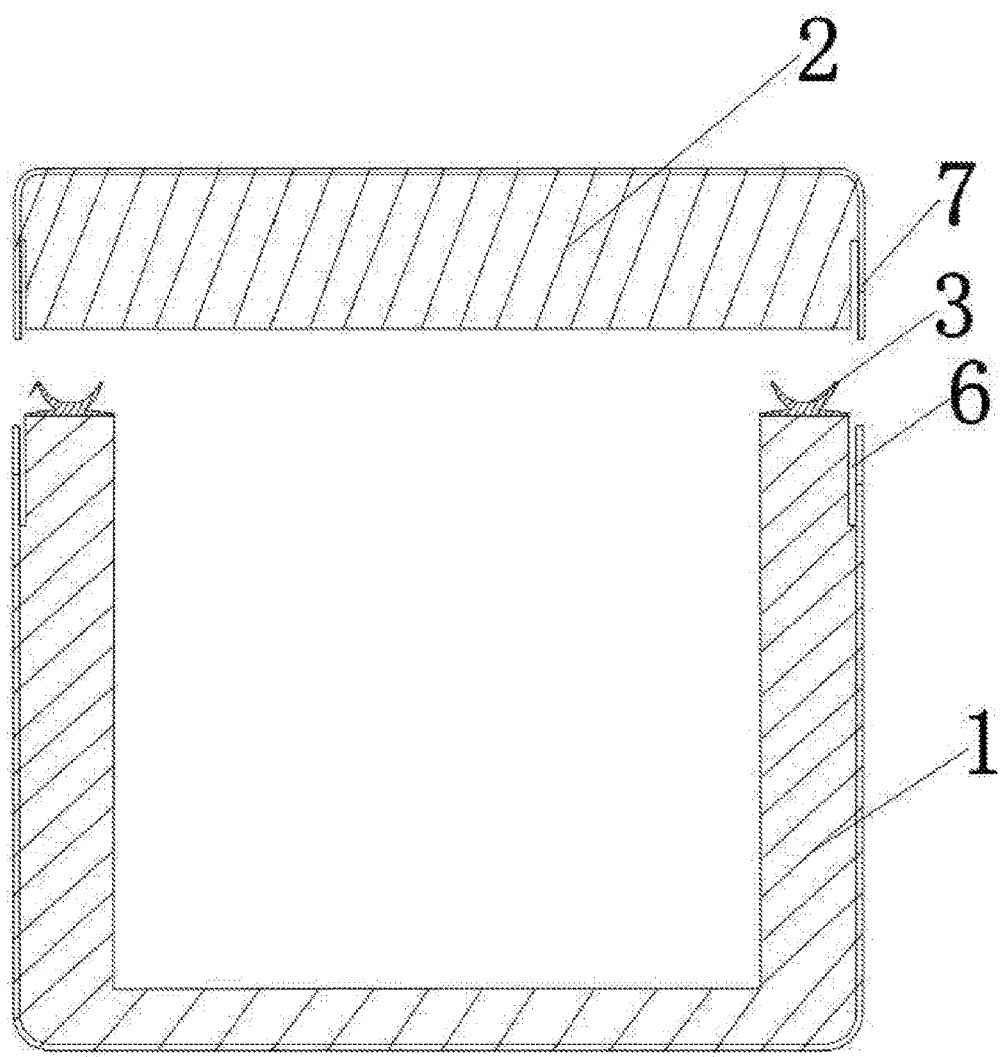
FIG. 4 is a sectional view of the invention.
Figure 5:
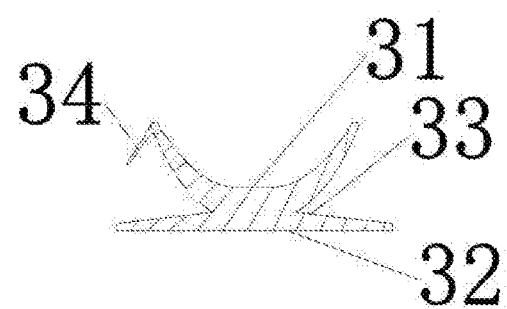
FIG. 5 is a magnified structural view illustrating the sucker rubber ribbon of the invention.
Figure 6:
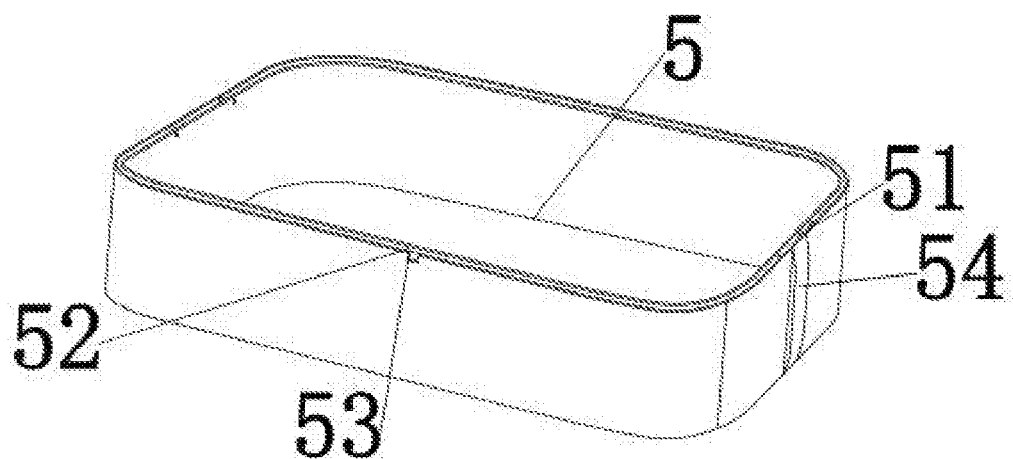
FIG. 6 is a schematic view illustrating the structure of the placing tray of the invention.
Figure 7:
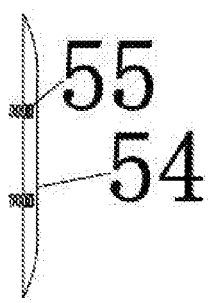
FIG. 7 is a magnified structural view illustrating the guide block of the invention.
Figure 8:
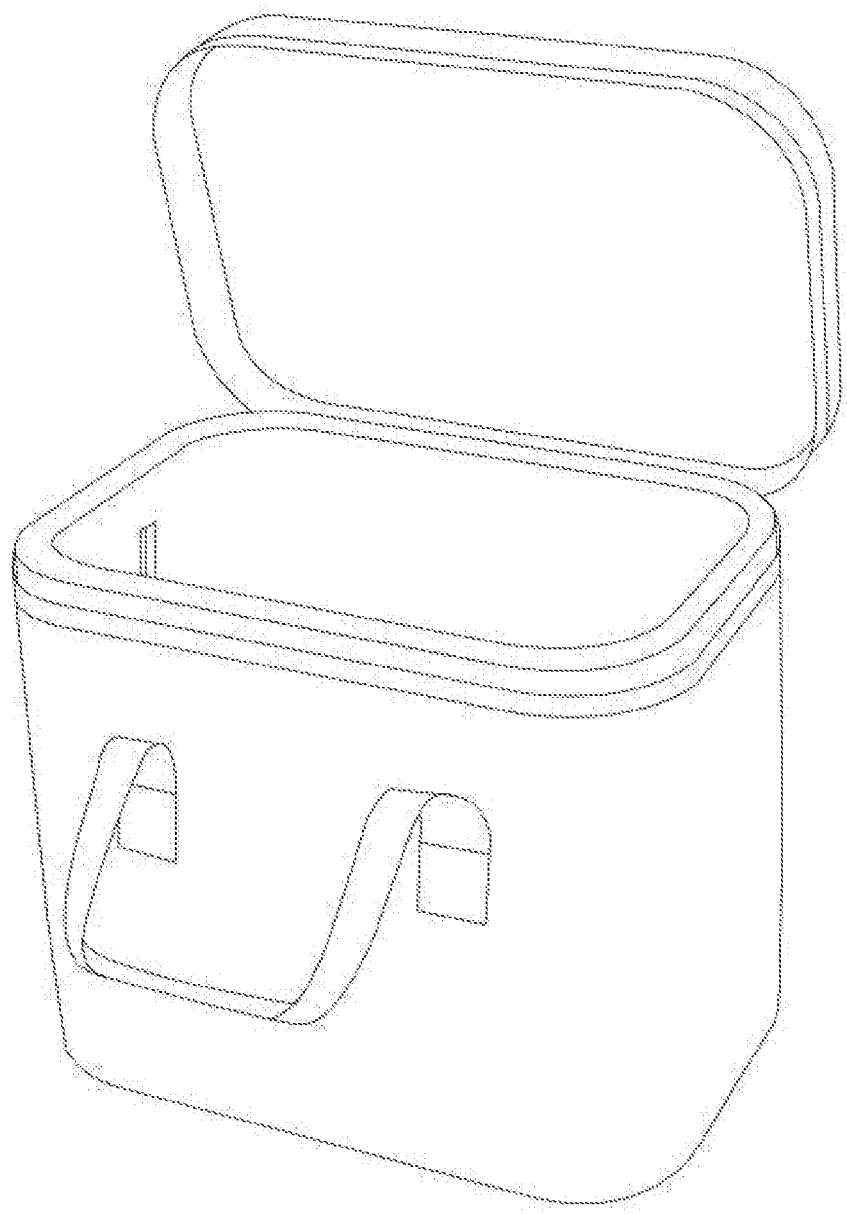
FIG. 8 is a schematic view illustrating the invention when the sucker rubber ribbon is not disposed.

As shown in FIG. 1-8, an airtight thermal insulation package with physical sucker structure at the convex edge of the opening thereof, comprising a package body 1 and a side flip cover 2 connected with the package body 1, wherein the periphery of the upper end of the package body 1 is a convex-edge structure, and the package body 1 and the side flip cover 2 both comprise a thermal insulation inner layer 11 and a connecting outer layer 12; the upper end of the convex-edge structure is provided with a sucker rubber ribbon 3 enabling an adsorption connection with the side flip cover 2; the middle portion of the opposite surface of the thermal insulation inner layer 11 is provided with a guide groove 4; the inside of the package body 1 is provided with a placing tray 5 for lifting up and down along the guide groove 4, and the placing tray 5 is provided with a guide block 54 mating with the guide groove; between the guide block 54 and the placing tray 5 is provided with an elastic piece 55 providing a stretching force for the guide block 54; the connecting end of the package body 1 and the side flip cover 2 is provided with an snap groove 6, and the side flip cover 2 is provided with a snap block 7 enabling a snap-fit with the snap groove 6; the outer side of the connecting end of the package body 1 and the side flip cover 2 is provided with a connecting piece 8 for closing the package body 1 and the side flip cover 2; the upper end of the placing tray 5 is provided with a concave groove 51, and two handles 52 are symmetrically hinged in the concave groove 51.

The outer surface of the connecting outer layer 12 is provided with a hand strap 9.

The sucker rubber ribbon 3 comprises a concave arc edge 31 and a bonding plate 32 disposed at the lower end of the concave arc edge 31; a concave groove 33 for pressing and deforming the sucker rubber ribbon 3 is formed between the concave arc edge 31 and the bonding plate 32; one side of the concave arc edge 31 is provided with a pull tab 34 for opening and closing the side flip cover 2.

The thermal insulation inner layer 11 and the connecting outer layer 12 are both made of aluminum film composite TPU material.

The upper end of the side of the placing tray 5 is provided with a notch 53 for toggling the handle 52.

The connecting piece 8 is a waterproof zipper or a bonding tape.

The thermal insulation lining is filled between the thermal insulation inner layer 11 and the connecting outer layer 12.

Each of the guide blocks 54 is arcuate in shape.

During the usage of the device, first of all, when using the thermal insulation package, it is necessary to check whether the package is damaged or broken. The inner layer of the package body 1 is made of aluminum film composite TPU material, and the connecting outer layer 12 thereof is also made of aluminum film composite TPU material. First, the edge of the waterproof zipper or the bonding tape is welded to the connecting end of the package body 1 and the side flip cover 2, then the thermal insulation inner lining is filled between the thermal insulation inner layer 11 and the connecting outer layer 12. The thermal insulation lining is formed by the foam modeling of the thermal insulation cotton material or high density foam, and the package body 1 and the side flip cover 2 are connected by it. The upper portion of the package body 1 is provided with a sucker rubber ribbon 3, and the lower bonding plate of the sucker rubber ribbon 3 is welded to the upper end of the package body 1 together. The structure of the sucker rubber ribbon 3 is made of TPU material or engineering material. Under the snap action of the waterproof zipper, the bonding tape or the external force, the concave arc edge of the sucker rubber ribbon 3 squeezes and sucks the side flip cover 2 to reach the principle of physical vacuum sucker. The upper edge of the sucker rubber ribbon 3 is provided with a pull tab 34; when the package body 1 is completely sucked by the sucker rubber ribbon 3 and is not east to open, the pull tab 31 of the upper edge of the sucker rubber ribbon 3 is pulled, which allows air to flow in, and functions to easily open the side flip cover 2. At the same time, the concave groove 33 on both sides of the sucker rubber ribbon 3 can also effectively block the flow of liquid or gas inside and outside, which better protects the package body 1 and prevents the internal liquid or gas from overflowing, thereby achieving the thermal insulation effect. The upper and lower ends of the guide block are both arcuate in shape; a stretching function is provided through the elastic piece (spring or elastic slice), which facilitates the taking out and putting of the placing tray 5.

The package can also be sealed through the convex-edge structure when the sucker rubber ribbon 3 is damaged or it is not used; the convex-edge structure directly extends to the inner top surface of the side flip cover 2 when the side flip cover 2 is closed, and when the package opening is closed by the zipper (bonding tape) or under the snap action of the external force, the convex-edge surface of the convex-edge structure press against the inner top surface of the side flip cover 2, to prevent the internal liquid or gas from overflowing, thereby achieving the sealing effect.

The above description is just a preferred embodiment of the invention, and is not intended to limit the invention. Any modifications, equivalent substitutions and improvements made within the spirit and principles of the invention shall all fall within the protection scope of the invention.

The invention claimed is:

1. An airtight thermal insulation package, comprising a package body (1) and a side flip cover (2) connected with the package body (1), wherein the periphery of the upper end of the package body (1) is a convex-edge structure, a physical sucker structure is provided on the convex-edge structure, and the package body (1) and the side flip cover (2) both comprise a thermal insulation inner layer (11) and a connecting outer layer (12); the upper end of the convex-edge structure is provided with a sucker rubber ribbon (3) enabling an adsorption connection with the side flip cover (2); a middle portion of an opposite surface of the thermal insulation inner layer (11) is provided with a guide groove (4); the inside of the package body (1) is provided with a placing tray (5) for lifting up and down along the guide groove (4), and the placing tray (5) is provided with a guide block (54) mating with the guide groove; between the guide block (54) and the placing tray (5) is provided with an elastic piece (55) providing a stretching force for the guide block (54); connecting end of the package body (1) and the side flip cover (2) is provided with an snap groove (6), and the side flip cover (2) is provided with a snap block (7) enabling a snap-fit with the snap groove (6); outer side of the connecting end of the package body (1) and the side flip cover (2) is provided with a connecting piece (8) for closing the package body (1) and the side flip cover (2): the upper end of the placing tray (5) is provided with a concave groove (51), and two handles (52) are symmetrically hinged in the concave groove (51).

2. The airtight thermal insulation package according to claim 1, wherein the outer surface of the connecting outer layer (12) is provided with a hand strap (9).

3. The airtight thermal insulation package according to claim 1, wherein the sucker rubber ribbon (3) comprises a concave arc edge (31) and a bonding plate (32) disposed at the lower end of the concave arc edge (31); a concave groove (33) for pressing and deforming the sucker rubber ribbon (3) is formed between the concave arc edge (31) and the bonding plate (32); one side of the concave arc edge (31) is provided with a pull tab (34) for opening and closing the side Hip cover (2).

4. The airtight thermal insulation package according to claim 1, wherein the thermal insulation inner layer (11) and the connecting outer layer (12) are both made of aluminum Him composite Thermoplastic Urethane (i.e. TPU) material.

5. The airtight thermal insulation package according to claim 1, wherein the upper end of the side of the placing tray (5) is provided with a notch (53) for toggling the handle (52).

6. The airtight thermal insulation package according to claim 1, wherein the connecting piece (8) is a waterproof zipper or a bonding tape.

7. The airtight thermal insulation package according to claim t, wherein a thermal insulation lining is Oiled between the thermal insulation inner layer (11) and the connecting outer layer (12).

8. The airtight thermal insulation package according to claim 1, wherein each of the guide blocks (54) is arcuate in shape.

\* \* \* \* \*